_United States Patent Office_

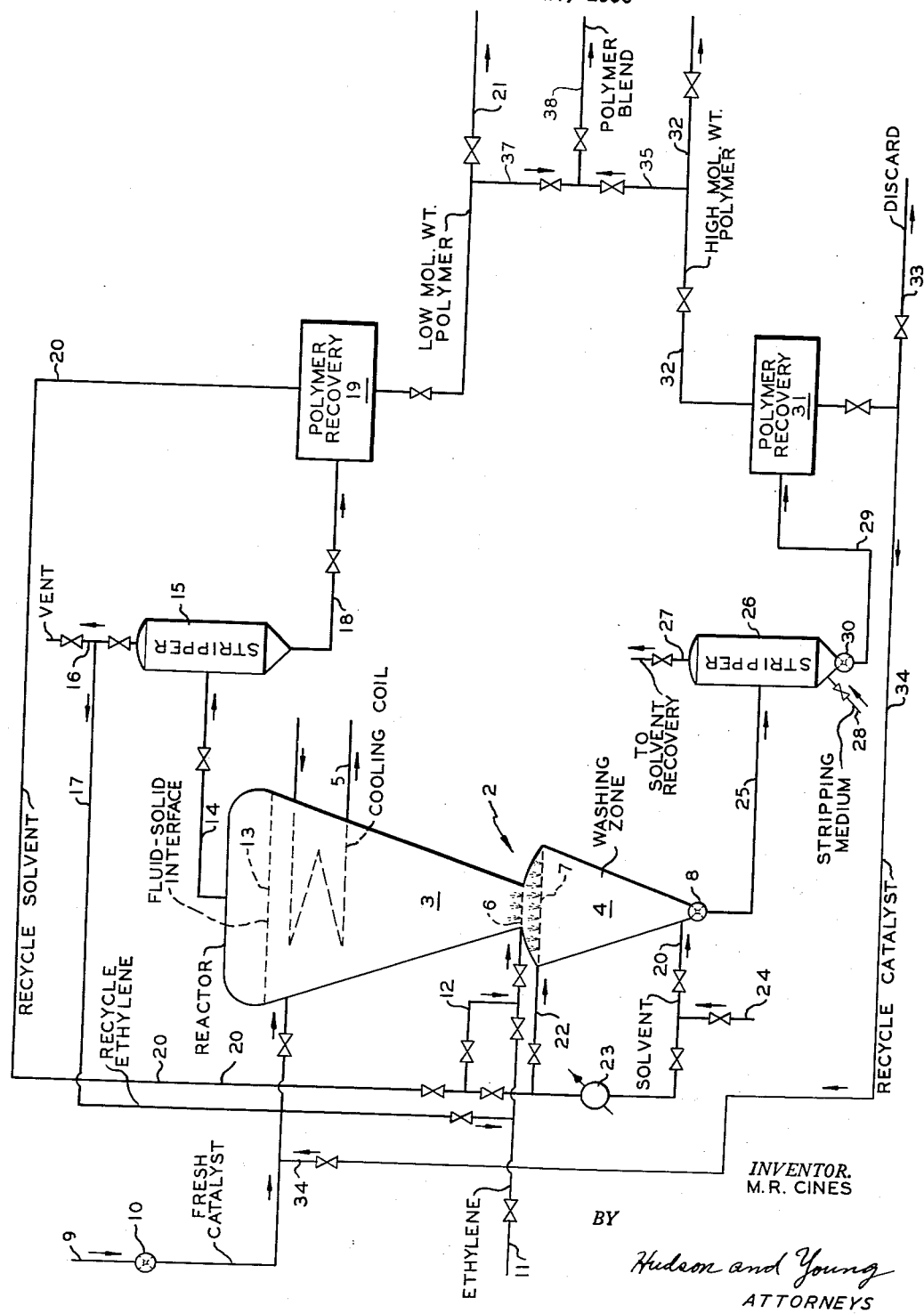

2,971,951
Patented Feb. 14, 1961

2,971,951
PROCESS FOR THE PRODUCTION OF SOLID POLYMER

Martin R. Cines, Bartlesville, Okla., assignor to Phillips Petroleum Company, a corporation of Delaware Filed June 25, 1956, Ser. No. 593,757
4 Claims. (Cl. 260—94.9)

This invention relates to polymerization of olefins. In one aspect it relates to an improved process for the production of solid polymer. In another aspect it relates to an improved process for the production of polymer in solid particulate form.

The production of solid polymers of olefins, such as ethylene, at high pressures has been known in the art for a number of years. Processes have recently been developed by which solid polymers can be produced at relatively low pressures in the presence of solid inorganic catalysts, such as metal oxides. In many of these processes, solid polymer is initially obtained in admixture with, and often in solution in, a solvent. Although the polymer can be commercially recovered from admixture with the solvent, relatively complex procedures are required.

An object of the present invention is to provide a process wherein normally solid polymers can be readily recovered in solid particulate form. Another object of the invention is to provide a process wherein solid polymer can be continuously produced in particulate form and with a minimum of processing steps. Another object is to provide a process wherein solid particulate polymers can be continuously produced and readily recovered in a process utilizing a mobile catalyst. Further objects and advantages of the invention will be apparent to those skilled in the art from the subsequent disclosure.

This invention comprises suspending a solid particulate catalyst in an upward flowing stream of an olefin which is diluted with a suitable diluent hydrocarbon in the liquid phase, effecting polymerization of the olefin to solid, non-tacky polymer in particulate form by contact with the catalyst under suitable reaction conditions which promote the formation and growth of solid particles of polymer in suspension, causing solid particles of polymer having a predetermined minimum size to settle against the stream of hydrocarbons, and recovering the settled particles.

In one modification of the invention, the settled particles can be washed, preferably countercurrently, with a suitable solvent to remove any relatively low molecular weight polymer from the product polymer. It has been found desirable in many cases, to remove from the product, polymer fractions having a molecular weight of the order of several hundred, usually less than 2000, and frequently of the order of 200 to 1000, because the presence of small amounts of such polymers tends to decrease the resistance of the polymer to thermal deformation and, in many cases, to impart an undesirable odor thereto.

Generally, when olefins are polymerized to high molecular weight polymers, the polymer products are mixtures of polymers having molecular weights of such an order that the fractions of the polymer vary in physical characteristics from relatively viscous liquids to relatively refractory crystalline solids. The relative distribution of the different molecular weight fractions in the product depends not only on the reaction conditions, but, at constant conditions, on the monomer itself. It has been found that certain monomers such as ethylene and conjugated dienes such as 1,3-butadiene and isoprene, as well as certain mixtures of monomers such as mixtures of ethylene with relatively minor amounts of higher olefins such as propylene and butenes, produce polymers which contain a very high percentage of solid materials and a very low percentage of oily, tacky, or waxy materials. When such monomers or comonomers are being converted to polymers, it has been found that when the temperature is maintained below about 230° F. the polymer forms in a solid, particulate, non-tacky or nonagglutinative state suspended in the reaction mixture and is readily separable therefrom with a minimum of processing steps for the removal of the solvent or diluent material utilized in the reaction mixture. This particular technique for the production of solid particulate polymer is being covered in a separate application.

The olefins which are suitable as monomers in the process of my invention are ethylene, mixtures of ethylene with higher olefins such as propylene, 1-butene, 1-pentene and 1,3-butadiene, as well as conjugated dienes themselves, e.g., 1,3-butadiene and isoprene.

The polymerization according to this invention is conducted in the presence of a liquid diluent, which is ordinarily a hydrocarbon which is inert and non-deleterious to the catalyst and the reactant materials present under the reaction conditions and which is liquid at the temperature and pressure utilized in the reaction zone. The diluent is preferably a paraffinic or a naphthenic hydrocarbon. Preferably it is a paraffinic hydrocarbon having from 3 to 12 carbon atoms per molecule or a naphthenic hydrocarbon having from 5 to 12 carbont atoms per molecule. A particular preferred class of diluents is made up of the paraffinic hydrocarbons having from 3 to 5 carbon atoms per molecule, i.e. propane, the butanes and the pentanes. These hydrocarbons are often preferred because of their relatively low solvent power for the solid polymers under the reaction conditions and because they are readily separable from the polymer by vaporization. However, other diluents of the class described can be utilized. Examples of these are neohexane, 2,3-dimethyl butane, normal hexane, normal heptane, normal octane, 2,2,4-trimethylpentane, cyclopentane, methylcyclopentane, cyclohexane, methylcyclohexane and the dimethylcyclohexanes.

The catalyst used according to my invention is generally a catalyst comprising chromium oxide and at least one material selected from the group consisting of silica, alumina, zirconia and thoria. This catalyst is preferred because it produces extremely high yields of polymer which is solid, non-tacky, and nonagglutinative under the reaction conditions described herein and because it produces a unique and highly desirable polymer. Such a catalyst can be prepared by impregnating a porous oxide selected from the group consisting of silica, alumina, zirconia and thoria, and including commercially available silica-alumina gel composites, with an aqueous solution of a chromium compound such as chromium trioxide or chromium trinitrate. The impregnated catalyst is then dried and activated by heating at an elevated temperature, preferably under non-reducing conditions. Such conditions preferably include a temperature in the general range 300 to 1500° F., more preferably 600 to 1100° F. and the absence of reducing gases such as hydrogen. It is further preferred that the activation be conducted under substantially anhydrous conditions in the presence of an oxidizing gas. A highly suitable activation atmosphere for this purpose is air which has a dew point below about 0° F. The activation time is ordinarily in the range 1 to 20 hours. However, much shorter activation times at higher temperatures and longer activation times at lower temperatures can be used. The catalyst is utilized in particulate, and preferably, in finely divided form. The particle size is ordinarily in the range from 10 to 250 mesh, preferably from about 20 to about 100 mesh. The presence of appreciable amounts of hexavalent chromium in the catalyst are much to be desired, and the presence of hexavalent chromium can be assured by the described activation in an anhydrous oxidizing atmosphere. The total chromium content of the catalyst can range from about 0.1 to 50 weight percent or more, based on the total catalyst weight. Ordinarily, however, the total chromium content is from about 1 to about 10 weight percent. It is preferred that the hexavalent chromium content be at least 0.1 weight percent. The hexavalent chromium content can be determined by leaching the catalyst with water and determining, by any suitable analytical method, the amount of chromium leached from the catalyst.

When the chromium oxide catalyst described hereinabove is utilized, suitable reaction conditions are: a temperature in the range 100 to 230° F., preferably from about 150 to about 230° F.; a pressure sufficient to maintain the diluent substantially in the liquid phase; and a residence time in the range 15 minutes to 10 hours, usually from about 30 minutes to about 5 hours. The flow of fluid through the reaction zone must be sufficient to maintain the catalyst in a fluidized state. The exact linear velocity will, of course, depend upon the density and the particle size of the catalyst, and other factors. A suitable fluidizing velocity can readily be determined by one skilled in the art by mere routine test under any given set of conditions.

It appears that a substantial portion of the polymer which forms according to my invention forms upon, or in contact with, the catalyst particle and gradually increases in size. Thus, at a given fluidizing velocity, when the particle reaches a certain size, it will no longer be fluidized but will settle against the upwardly rising stream of hydrocarbon. In this manner, according to my invention, the product polymer can be withdrawn continuously from the reaction zone. The desired particle size can be selected and the fluidizing velocity correspondingly adjusted by one skilled in the art, on the basis of mere routine test, to withdraw polymer particles of any desired size continuously from the reaction zone.

The accompanying drawing is a schematic flow sheet which illustrates one embodiment of this invention.

As illustrated in the drawing, there is provided an apparatus designated generally as 2 which comprises a generally frustoconical reaction chamber 3 positioned above an in open communication with a washing chamber 4, also of frustoconical configuration. Unit 5 represents a cooling coil positioned within reaction chamber 3, for the purpose of removing exothermic heat of polymerization. It will be recognized by those skilled in the art that other heat extraction means, such as a jacket encompassing the reactor, can be utilized. A plurality of jets or a sparging device 6 can be provided at or adjacent the locus of joinder of the two chambers for the purpose of introducing reactant monomer. A sparging device 7 can also be utilized for the introduction of diluent. A star valve 8, or other equivalent device, is positioned in the bottom of washing zone 4 for the removal of particulate solid from said zone. Catalyst is introduced into reaction chamber 3 through conduit 9, which is provided with a star valve 10, or equivalent device for the feeding of particulate solids continuously. Since such apparatus is well known in the art, it is indicating schematically in the drawing and requires no further discussion at this point.

In the operation of a process according to this invention, ethylene is introduced through inlet 11 through sparging device 6 into reaction zone 3. Diluent, such as isopentane, or n-pentane, can be added through conduit 12, or through conduit 22, or through both conduits simultaneously. The mixture of ethylene and diluent rises through reaction zone 3 at a fluidizing velocity and maintains the particulate catalyst in an apparently ebullient state, preferably in the form of a dense fluidized bed. However, the catalyst can be maintained under free-settling conditions rather than the hindered-settling conditions of a dense fluidized bed. Indeed, in many cases, free-settling conditions are desirable because the chromium oxide catalyst which I prefer to use produces an extremely high yield of polymer per unit weight of catalyst, and the catalyst can be used in such a low concentration (e.g. 0.01 to 1 weight percent of the reactor contents) that its removal from the product polymer is unnecessary for certain applications. When a dense fluidized bed is used, the upper part of the bed can be represented by an interface or phase division line 13, above which is a reservoir of hydrocarbon which is relatively free of suspended catalyst. Hydrocarbon is withdrawn from this body of relatively catalyst-free material through conduit 14 and is passed to stripper 15 wherein the pressure is lowered sufficiently to facilitate the venting of any unreacted or inert gas through vent outlet 16. If desired, the outlet from reactor 3 can be covered with a screen or equivalent device to effect further separation of suspended solids from the effluent. When relatively pure ethylene is used, the vented gas has a high ethylene content and can be recycled through conduit 17, entirely or in part. The liquid in stripper 15 is passed through conduit 18 to polymer recovery zone 19. This liquid contains, ordinarily, a relatively small amount, e.g. about 1 or 2 weight percent, based on total polymer, of relatively low-boiling or low molecular weight polymer which can range in physical characteristics from an oil to a wax. Polymer recovery zone 19 can include any known form of apparatus for recovering the dissolved polymer from solution in the diluent. Thus it can include ordinary fractional distillation or flashing equipment, or precipitation equipment wherein the dissolved polymer is precipitated from solution by cooling or by means of an antisolvent, such as acetone or methyl ethyl ketone. The recovered solvent is recycled through conduit 20 to the reaction zone. When an antisolvent of the type mentioned is used it must be separated from the solvent, in means not shown, prior to recycle of the solvent. The low molecular weight polymer can be removed from the system through conduit 21.

The relatively large particle size polymer, usually accompanied by catalyst, settles from the bottom of reactor 3 into washing zone 4 and is countercurrently contacted with solvent introduced through conduits 22 and 20. Thus, further washing of the highly crystalline polymer to remove low molecular weight and/or non-crystalline material is effected in washing zone 4. The solvent introduced into the bottom of washing zone 4 can be heated in heater 23 to a temperature higher than that which is maintained in reaction zone 3 so that a fractionation or rectification effect can be obtained during the upward flow of solvent through washing zone 4 and reactor 3. Additional heaters and/or coolers can be provided in washing zone 4 and reactor 3. Additional heaters and/or coolers can be provided in washing zone 4 as desired. Make-up solvent can be added through inlet 24. Washed particulate polymer is withdrawn from zone 4 through star valve 8 and is passed through conduit 25 to stripper 26. The particulate polymer can be withdrawn in the form of a thick slurry by withdrawing sufficient solvent therewith, or it can be withdrawn in the form of particulate solid and caused to flow by gravity or other means, such as a mechanical conveyor, to stripper 26. In stripper 26, adhering solvent or diluent is removed, ordinarily by vaporization, settling, filtration, and/or centrifugation and withdrawn from the system through outlet 27. Any means known in the art can be utilized to recover and recycle any solvent withdrawn through conduit 27. If desired, a stripping medium, usually an inert gas such as steam, methane, nitrogen or carbon dioxide, can be introduced through inlet 28 to aid in the vaporization of adhering diluent. The residual polymer remaining in stripper 26 can be recovered, by means not shown, at this point, especially where a relatively small amount of catalyst has been used in the reaction zone. This type of recovery is desirable where the polymer is to be used for the production of heavy castings, thick-walled pipe or similar materials, which are not intended for use under conditions at which complete freedom from inorganic solids is desired, or where color and opacity are not critical considerations. When separation of the catalyst is desired, the polymer can be passed through conduit 26 and star valve (or equivalent means) 30 to polymer recovery zone 31. In zone 31 the catalyst can be separated from the polymer by melting and separation of solids from the melt, or by dissolution in a solvent, such as toluene, tetralin or cyclohexane, followed by removal of the suspended catalyst and, finally, removal of the solvent. Any other suitable means for removing solid inorganic material from the polymer can be utilized. The purified polymer can be withdrawn from the process through outlet 32. Removed catalyst can be discarded through outlet 33 or recycled through conduit 34. The recovered catalyst can be regenerated by contact with an oxidizing gas, in means not shown, if desired. Suitable liquid or gaseous vehicles, as well as inlets, outlets, storage, and transfer means therefor, for conveying the particulate solids in the system can be readily provided by those skilled in the art and are therefore not illustrated in the drawing. Alternatively, the conveyance of solids can be effected by purely mechanical means such as mechanical conveyors.

When it is desired to take advantage of the softening effect of the lower molecular weight polymer, this polymer can be mechanically blended with the high molecular weight polymer in any desired portions by the use of conduits 35, 37 and 38 and the resulting mixture extruded as product.

The following is a description of a specific embodiment of this invention in connection with a system of the type illustrated in the drawing:

Ethylene is passed into reactor 3 through inlet 11, being dispersed by means of a perforated distribution ring 6. A slurry of catalyst in normal pentane is introduced into reactor 3 through inlet 9. Normal pentane is introduced into the top of washing zone 4 through line 22. Additional normal pentane is introduced into washing zone 4 through line 20 at the bottom of washing zone 4. The over-all linear velocity of upward flow of fluid adjacent distribution ring 6 in the bottom portion of reactor 3 is 2.39 feet per minute. The temperature in reactor 3 is 210° F. and the pressure is 500 p.s.i.a. Clarified liquid is withdrawn from the top of reactor 3 through conduit 14 and passed to stripper 15 which is operated at approximately 100 p.s.i.a. and 200° F. Unreacted ethylene and accompanying gas are vented through outlet 16. A dilute solution of low molecular weight polyethylene in normal pentane is recovered through conduit 18. A product stream comprising a suspension of particulate polyethylene in normal pentane is withdrawn from washing zone 4 through star valve 8 and conduit 25. This stream comprises normal pentane containing, in suspension, a polyethylene product having a molecular weight, based on inherent viscosity, of approximately 125,000.* This stream contains 25 weight percent of solids, the minimum particle diameter of which is approximately one millimeter. The pentane in this product stream is removed from the suspended polymer by vaporization. The following tabulation shows the composition and the weights of the various streams described:

|  | Feed | Catalyst Slurry | Diluent | Wash Liquid | Product | By-product |
|---|---|---|---|---|---|---|
| Stream No | 11 | 9 | 22 | 20 | 25 | 18 |
| Methane | 61 |  |  |  |  | 85 |
| Ethylene | 106,719 |  | 18 | 6 |  | 15,423 |
| Ethane | 460 |  | 11,094 | 3,698 | 43 | 2,168 |
| N-Pentane |  | 17,136 | 1,286 | 428 | 6 | 294,352 |
| Polyethylene |  |  | 440,007 | 146,669 | 309,460 |  |
| Catalyst |  | 530 |  |  | 106,025 | ¹ 20 |
|  |  |  |  |  | 530 |  |
| Total, lb/day | 107,240 | 17,666 | 452,405 | 150,801 | 416,064 | 312,048 |

¹ Pentane-soluble fraction having a weight average molecular weight, based on inherent viscosity, below 5000.

The total residence time of polymerizing ethylene in reactor 3 is approximately four hours.

The catalyst initially fed into reactor 3 has particle sizes in the range 50 to 250 mesh or finer. The catalyst is prepared from a commercial silica-alumina composite in the form of microspheres. This composite contains approximately 87 weight percent silica and 13 weight percent alumina. The silica-alumina composite is immersed in an aqueous solution of chromium trioxide. After several minutes mixing time, the supernatant liquid is decanted and the impregnated solid is dried at a temperature ranging from about 200 to about 350° F. The dried composite is then heated at a temperature of approximately 930° F. for five hours in a stream of air having a dew point below 0° F. The final catalyst has a total chromium content of approximately 2.5 weight percent. This chromium is in the form of oxide and approximately 2 weight percent, based on total catalyst weight, of chromium in the hexavalent state.

It will be clear to those skilled in the art that other particle size relationships may be practiced in connection with the specific embodiment illustrated. For example, the minimum particle size of the polymer withdrawn can range from 0.5 to 5 millimeters or higher. Also, different velocities of linear flow through reactor 3 and washing zone 4 can be utilized so long as relatively large particle size polymer is allowed to settle through washing zone 4 as previously described herein. These velocities are ordinarily in the range from about 0.5 to about 50 feet per minute.

While certain process steps, compositions, structures and examples have been shown for purposes of illustration, the invention is not limited thereto. Variation and modification are possible within the scope of the disclosure and the claims. Thus the reactor and the washing chamber need not be strictly conical in form; each or either can be pyramidal, or in the form of an exponential horn, or in the form of a conic frustum surmounted by a cylinder or a pyramidal frustum surmounted by a prism. It is, however, preferred that the configuration of the reactor be such that a higher linear flow velocity can readily be maintained in the lower part than in the upper part and catalyst settling in the upper part can thus be effected.

It is also within the scope of this invention to use a solvent in the washing zone which is different from that used in the polymerization zone.

While the invention has been described with reference to a chromium oxide catalyst, the invention is also applicable to other solid polymerization catalysts capable of catalyzing the formation of solid polymers.

I claim:

1. A process which comprises maintaining a fluidized catalyst comprising chromium oxide associated with at least one material selected from the group consisting of silica, alumina, zirconia and thoria, said catalyst containing chromium in the hexavalent state and having been

---

* 24,500 × inherent viscosity based on solution of 0.2 gm. polymer in 50 cc. tetralin at 130° C.

activated by heating at an elevated temperature under non-reducing conditions, in a polymerization zone positioned above and in open communication with a washing zone, maintaining in said polymerization zone a temperature in the range 150 to 230° F., a pressure sufficient to maintain the hydrocarbon diluent subsequently described substantially in the liquid phase and a linear flow velocity sufficient to fluidize the bulk of said catalyst, passing a liquid hydrocarbon selected from the group consisting of naphthenic hydrocarbons having from 5 to 12 carbon atoms per molecule and paraffinic hydrocarbons having from 3 to 12 carbon atoms per molecule upwardly through said washing zone and said polymerization zone, adding ethylene at a lower part of said polymerization zone, producing in the polymerization zone particulate solid, non-tacky ethylene polymer having a particle size exceeding the maximum size fluidizable in said ethylene and hydrocarbon diluent whereby said particles settle through said polymerization zone and said washing zone, and recovering said particles.

2. A process according to claim 1 wherein the temperature in said washing zone is maintained higher than that in said polymerization zone.

3. A process which comprises maintaining a fluidized catalyst in a polymerization zone positioned above and in open communication with a washing zone, adding a gaseous olefin monomer at a lower part of said polymerization zone, said monomer being polymerizable to a particulate solid non-tacky polymer, passing a liquid hydrocarbon diluent which is inert and nondeleterious to said catalyst under the polymerization conditions upwardly through said washing zone and said polymerization zone, maintaining said polymerization zone at a pressure sufficient to maintain said diluent substantially in the liquid phase, maintaining a linear flow velocity within said polymerization zone sufficient to fluidize the bulk of said catalyst, producing in the polymerization zone particulate solid non-tacky polymer having a particle size exceeding the maximum size fluidizable in said monomer and diluent whereby said particles settle through said polymerization zone and said washing zone and recovering said particles.

4. A process which comprises maintaining a fluidized catalyst comprising chromium oxide associated with at least one material selected from the group consisting of silica, alumina, zirconia and thoria, said catalyst containing chromium in the hexavalent state and having been activated by heating at an elevated temperature under non-reducing conditions, in a polymerization zone positioned above and in open communication with a washing zone, maintaining in said polymerization zone a pressure sufficient to maintain the hydrocarbon diluent subsequently described substantially in the liquid phase and a linear flow velocity sufficient to fluidize the bulk of said catalyst, passing a liquid hydrocarbon selected from the group consisting of naphthenic hydrocarbons having from 5 to 12 carbon atoms per molecule and paraffinic hydrocarbons having from 3 to 12 carbon atoms per molecule upwardly through said washing zone and said polymerization zone, adding ethylene at a lower part of said polymerization zone, producing in the polymerization zone, particulate solid, non-tacky ethylene polymer having a particle size exceeding the maximum size fluidizable in said ethylene and hydrocarbon diluent whereby said particles settle through said polymerization zone and said washing zone, and recovering said particles.

References Cited in the file of this patent

UNITED STATES PATENTS

| | | |
|---|---|---|
| 2,692,259 | Peters | Oct. 19, 1954 |
| 2,719,143 | Van Dijk et al. | Sept. 27, 1955 |
| 2,755,324 | Mueller | July 17, 1956 |
| 2,825,721 | Hogan et al. | Mar. 4, 1958 |